(No Model.)  2 Sheets—Sheet 1.
S. PENNINGTON, W. BAHEL & E. WEHRT.
BICYCLE SUPPORT.
No. 541,880. Patented July 2, 1895.
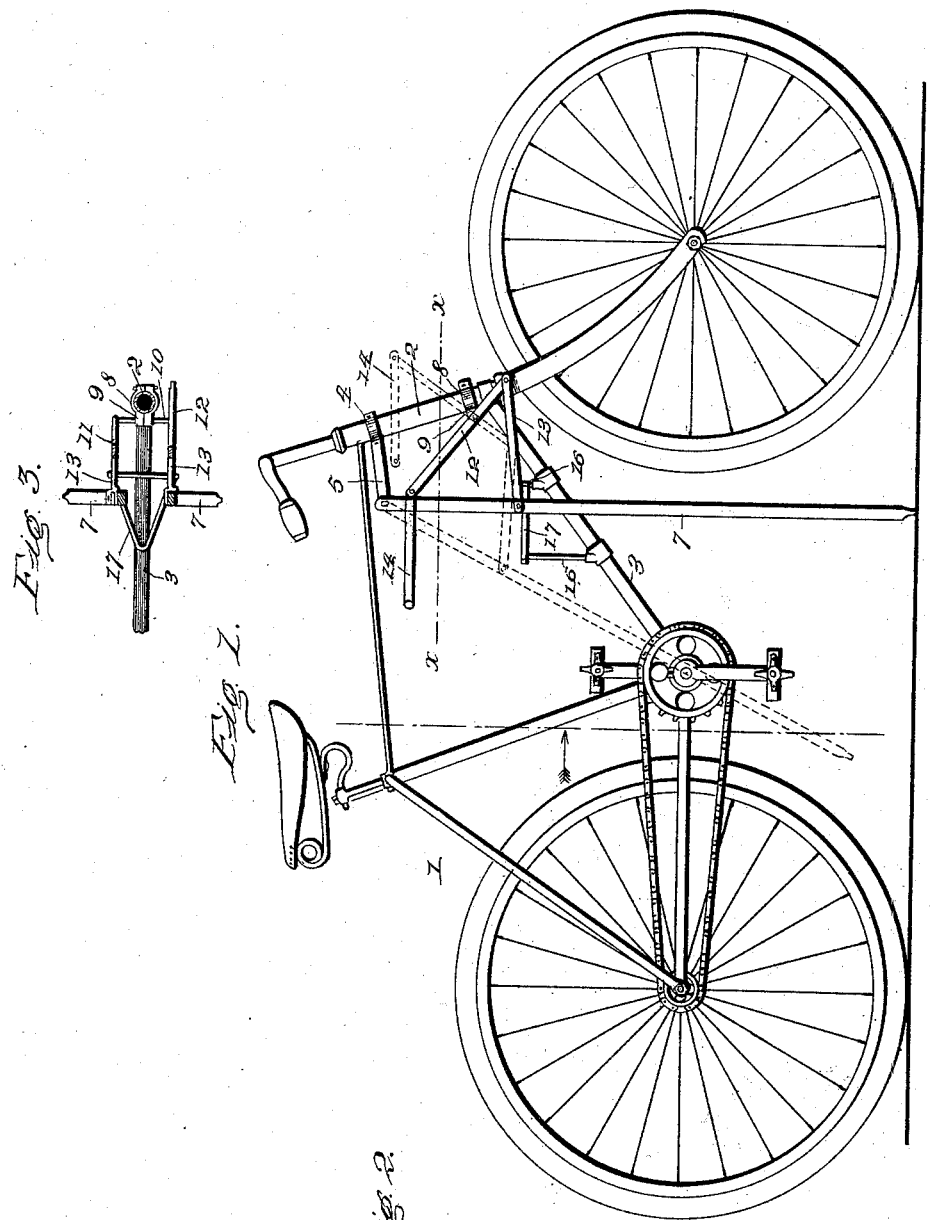
Witnesses
Theo. L. Getchel.
Louis G. Randall.
Inventors
Steve Pennington,
W. Bahel and
Edw. Wehrt
by John Wedderburn
their Attorney.

(No Model.) 2 Sheets—Sheet 2.
S. PENNINGTON, W. BAHEL & E. WEHRT.
BICYCLE SUPPORT.
No. 541,880. Patented July 2, 1895.
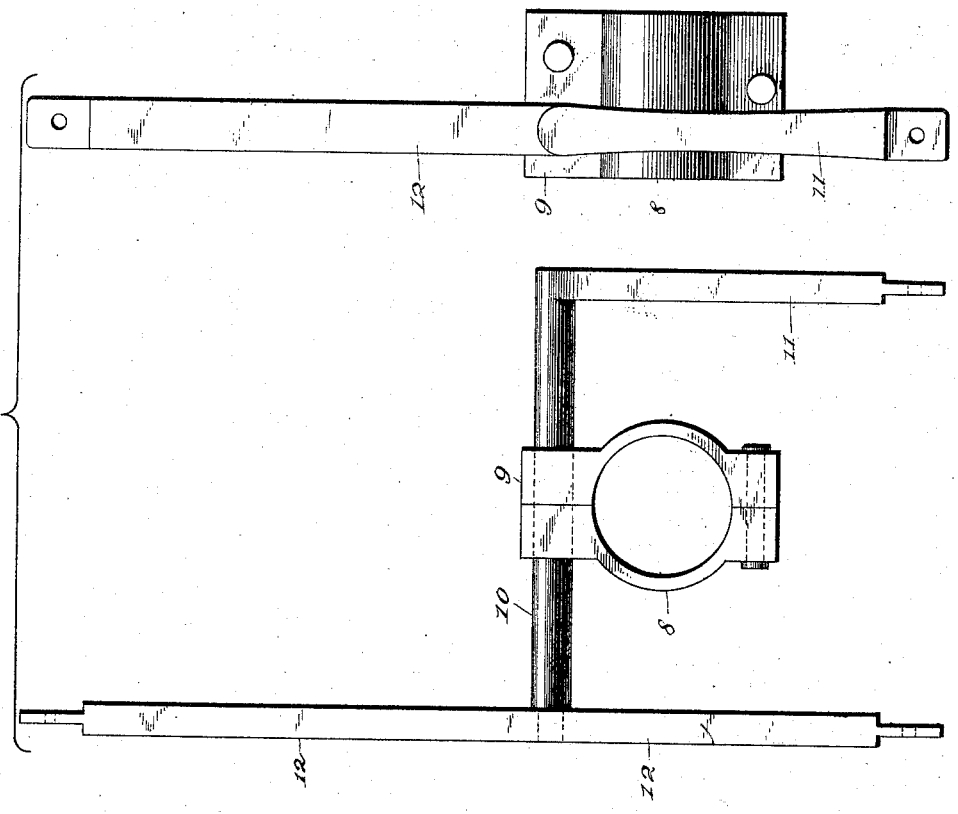
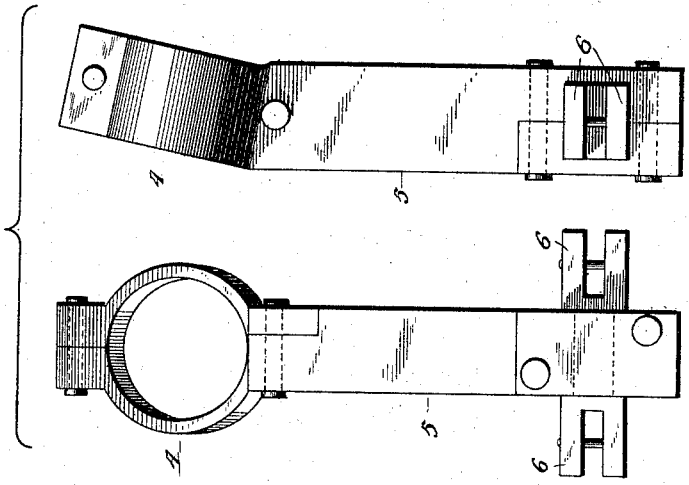
Witnesses
Thos. L. Gatchel.
Louis G. Randall
Inventors
Steve Pennington,
Wm Bahel and
Edw. Wehrt.
by John Wedderburn
their Attorney.

UNITED STATES PATENT OFFICE.

STEVE PENNINGTON, WILLIAM BAHEL, AND EDWARD WEHRT, OF LAKE CHARLES, LOUISIANA.

BICYCLE-SUPPORT.

SPECIFICATION forming part of Letters Patent No. 541,880, dated July 2, 1895.

Application filed January 30, 1895. Serial No. 536,699. (No model.)

*To all whom it may concern:*

Be it known that we, STEVE PENNINGTON, WILLIAM BAHEL, and EDWARD WEHRT, citizens of the United States, residing at Lake Charles, in the parish of Calcasieu and State of Louisiana, have invented certain new and useful Improvements in Bicycle-Supports; and we do hereby declare the following to be a full, clear, and exact description of the invention, such as will enable others skilled in the art to which it appertains to make and use the same.

Our invention relates to improvements in supports for bicycles, the object of the same being to provide a bicycle of ordinary construction with supporting legs for holding bicycles in an upright position when at rest and for throwing them back out of engagement with the ground when the bicycle is in motion.

The invention consists of a pair of legs pivoted to the outer ends of a small shaft rotatably mounted in the end of a bracket supported at the upper end of the front supporting bar of the bicycle frame, and extending rearwardly therefrom. At a point below its pivotal point the said supporting legs have pivoted to them connecting rods which are in turn connected to the lower ends of a lever pivoted in the front supporting bar of the bicycle frame, the said lever extending upwardly and having an operating bar or lever connected therewith. The said legs are connected near their pivotal points by a coiled spring, which tends to draw them inwardly and the said legs are adapted to be engaged by an angularly shaped guide bracket secured to the lower brace of the bicycle frame, whereby the said legs are thrown apart when drawn forward to be brought into engagement with the ground and are drawn together when in their rearward position out of engagement with the ground.

The invention also consists in other details of construction and combinations of parts which will be more fully hereinafter described and claimed.

In the drawings forming a part of this specification, Figure 1 represents a side elevation of a bicycle embodying our attachments. Fig. 2 is a view of the same in section looking in the direction of the arrow, Fig. 1. Fig. 3 is a section on the line $x-x$ of Fig. 1. Fig. 4 is a detail view of the supporting bracket for the legs. Fig. 5 is a detail view of one of the operating levers.

Like reference numerals indicate like parts in the various views.

1 represents a bicycle of ordinary construction, 2 the front supporting bar of its frame, and 3 the lower brace of said frame. Secured to the upper part of the front supporting bar 2 is a rearwardly extending bracket 4 having a shaft 5 mounted in its inner end, the said shaft having bifurcated ends 6, 6, in which the supporting legs 7, 7, are pivotally mounted. On the front supporting bar 2 at a point somewhat below the point of connection of the bracket 4, is secured a collar 8 having a perforated extension 9 thereon through which passes a rod 10 having a right-angular extension 11, and having keyed to its other end a rod 12. The rod 10, the extension 11 and the rod 12, form unitedly one of the operating levers of the device. Connected to the lower ends of the extension 11 and the rods 1 are connecting rods 13 which are in turn pivotally connected to the legs 7 at a point below their point of connection with the bracket 4. The upper end of the rod 12 has connected to it a rearwardly extending bar 14 provided with a handle by means of which and the intermediate connections, the legs 7 are moved forwardly or backwardly. At the upper ends of the legs 7 near the point of connection with the bracket 4 the said legs are connected by means of a coiled spring 15 for a purpose which will appear later. Secured to the cross brace 3 of the bicycle frame are two upright bars 16 supporting at their upper ends an angularly shaped guide bracket 17, as clearly shown in Fig. 2. The legs 7 are adapted to bear against the sides of said angular bracket 17 and when they are drawn forward they are at the same time thrown outward by reason of the angular sides of said bracket.

When it is desired to support the bicycle, with our attachment applied, the handle 14 is drawn back, which throws forward the lower ends of the extension 11 and the rod 12, and through the connecting rods 13, draws the legs 7 forward and by reason of the angularly shaped bracket 17, the said legs are at the same time thrown outwardly, forming a substantial support for the bicycle. A reverse movement of the handle 14 will throw the legs 7 backward and the spring 15 draws said legs together.

It will be seen that we have devised a support very simple in construction, effective in operation, and an improvement upon the devices of a similar nature, which have preceded it.

Having now described our invention, what we claim as new, and desire to secure by Letters Patent, is—

1. The combination with a bicycle of ordinary construction, of means for supporting the same when at rest, consisting of a pair of legs pivoted to a bracket mounted on the front supporting bar of the bicycle frame, a lever having bifurcated lower ends pivoted to said front supporting bar, and having a handle for actuating the same, connecting bars between said bifurcated ends and said legs, and an angularly shaped guide bracket mounted on the cross brace of the bicycle frame, whereby upon actuating said handle in one direction the said legs are thrown forwardly and outwardly for the purpose of supporting the bicycle, and by the reverse movement of said handle the said legs are thrown back and drawn together, substantially as and for the purpose described.

2. The combination with a bicycle of ordinary construction, of means for supporting the same when at rest, consisting of a pair of legs pivoted to the outer ends of a shaft rotatably mounted in the ends of a bracket secured to the front supporting bar of the bicycle frame, springs connecting said legs at their upper ends, a collar secured to the said front supporting bar of the bicycle frame, having a rearward extension, a lever having bifurcated ends, mounted in said extension, and having a handle connected to its upper end, rods connecting the said bifurcated ends with said legs, and an angularly shaped guide bracket against which said legs are adapted to bear, substantially as and for the purpose described.

In testimony whereof we have signed this specification in the presence of two subscribing witnesses.

STEVE PENNINGTON.
WILLIAM BAHEL.
EDWARD WEHRT.

Witnesses:
   W. H. HASKELL, Jr.,
   H. C. GILL.